Figure 1:
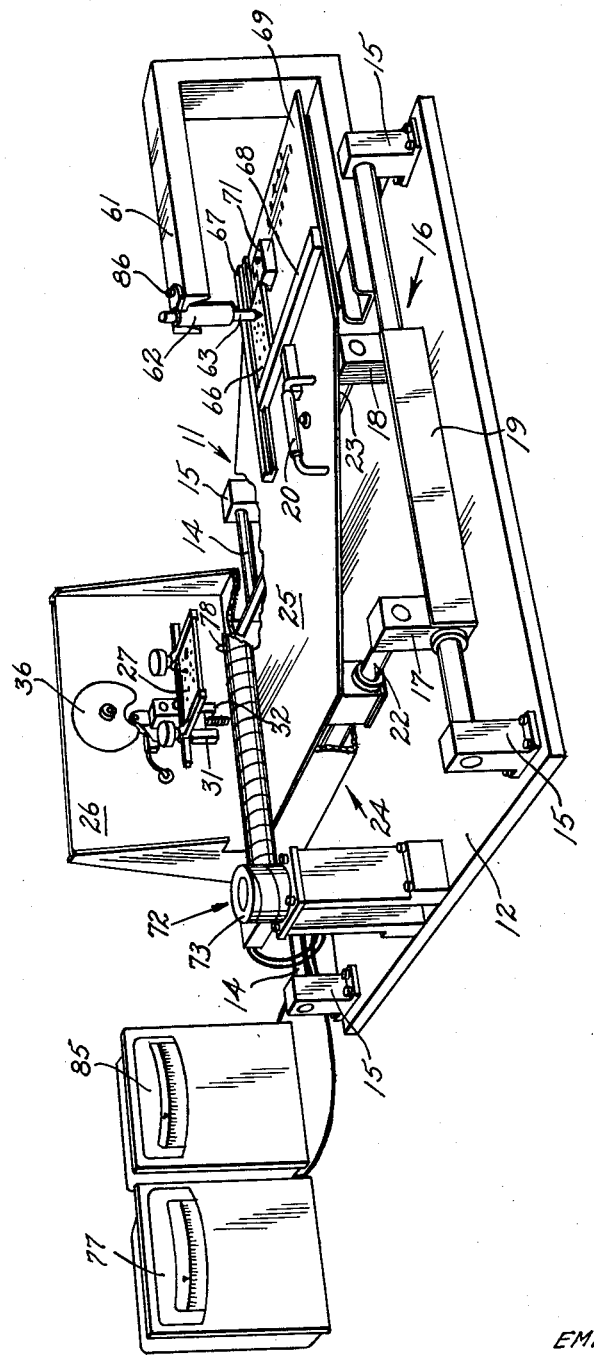

March 31, 1964  E. E. NABAL  3,126,854
SOLDERING MACHINE
Filed June 16, 1961  3 Sheets-Sheet 1

INVENTOR.
EMERSON E. NABAL
BY
H. H. Louche
Paul S. Collignon
ATTORNEYS

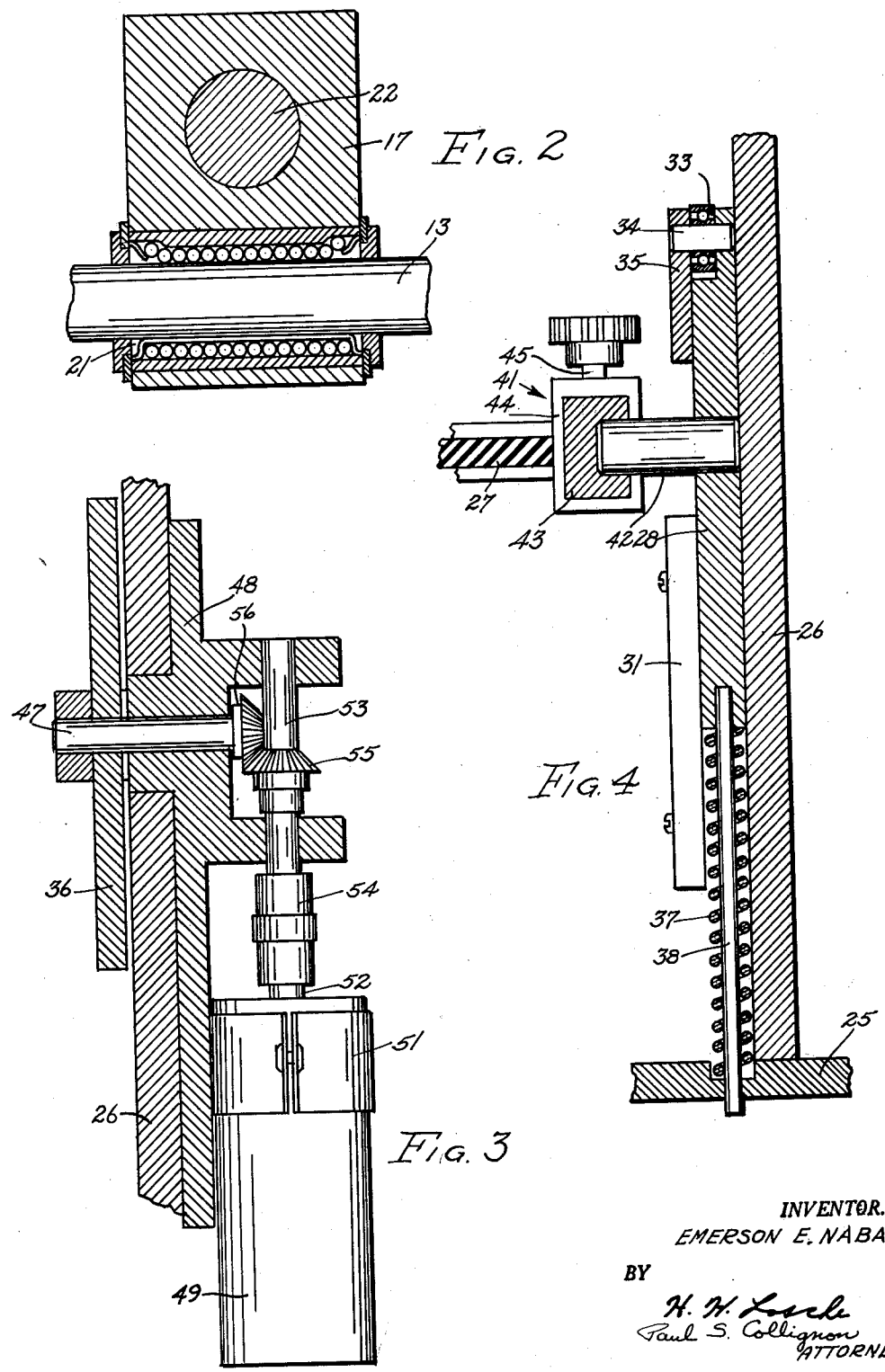

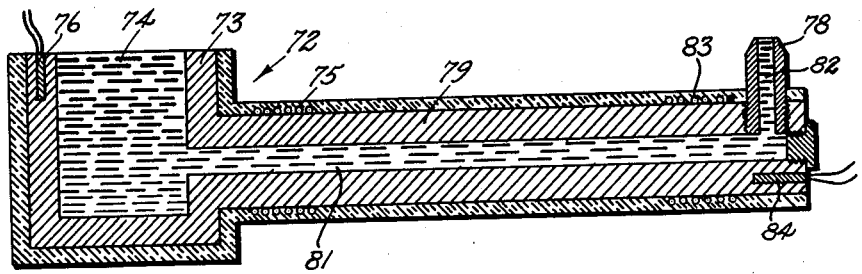
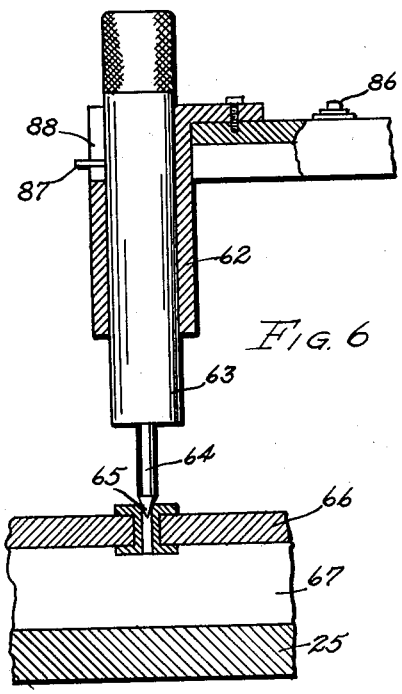
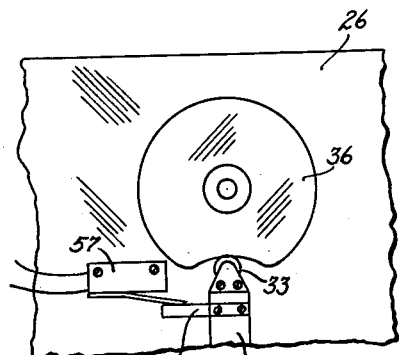
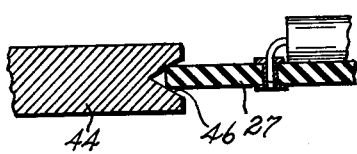
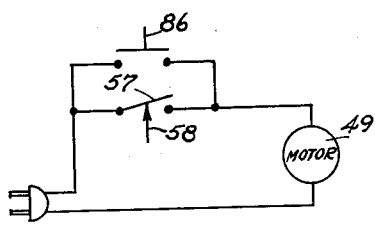

United States Patent Office 3,126,854
Patented Mar. 31, 1964

3,126,854
SOLDERING MACHINE
Emerson E. Nabal, Indianapolis, Ind., assignor to the United States of America as represented by the Secretary of the Navy
Filed June 16, 1961, Ser. No. 117,759
8 Claims. (Cl. 113—124)
(Granted under Title 35, U.S. Code (1952), sec. 266)

The invention described herein may be manufactured and used by or for the Government of the United States of America for governmental purposes without the payment of any royalties thereon or therefor.

The present invention relates to a soldering machine, and more particularly to a soldering machine for soldering components to printed circuitry boards.

The term "soldering" is generally understood to mean the joining of two metal surfaces by means of another metal or alloy that is applied in the molten condition; the metal or alloy used as a bond is the solder. One of the requisites for a solder is that its melting point must be considerably lower than that of the metals being joined. Soldering of electrical components, such as resistors and capacitors, to printed circuitry boards is done primarily in order to make a good electrically conductive joint, and also the solder serves as a mechanical bond to hold the components in position.

Heretofore, the soldering of electrical components to printed circuitry boards was done by either a hand soldering operation or by a dip soldering technique. Hand soldering, which is done by manually operating a soldering iron, requires considerable skilled labor and thus is not an economical operation. While plurality of solder joints can be made at one time by a dip soldering technique, this method has several limitations and disadvantages. For one thing, this technique can only be used when components are mounted to one side of the board. Also, the heat of the molten solder often causes blistering and separation of the metal conductors from the insulation, which results in an undesirable end product.

In the present invention, a board to be soldered is mounted on a frame that is slidably mounted in two mutually perpendicular directions. A pattern board is also attached to the frame and when a point on the pattern is positioned beneath a locating pin, a corresponding point on the board to be soldered is positioned above a soldering nozzle that is fed from a soldering pot. A cam mechanism lowers the board to be soldered so that it comes into contact with the soldering nozzle, and this contact is maintained a certain period of time to allow the solder to flow into the joint being soldered. The board is then automatically raised and the frame can be moved to a new position. As the soldering nozzle delivers an exact amount of solder for each joint, the finished board is comprised of soldered joints that are uniform and of high quality.

It is therefore a general object of the present invention to provide an improved soldering machine for soldering electrical components to a printed circuitry board.

Another object of the present invention is to provide an improved soldering machine that will feed a globule of solder to a joint on a printed circuitry board.

Other objects and advantages of the present invention will be readily appreciated as the same becomes better understood by reference to the following detailed description when considered in connection with the accompanying drawings wherein:

FIG. 1 is a perspective view showing a preferred embodiment of the present invention;
FIG. 2 is a sectional view showing a sliding mechanism;
FIG. 3 is a detailed sectional view showing a cam and drive mechanism;
FIG. 4 is a sectional view showing a sliding mechanism for a board holder;
FIG. 5 is a sectional view showing a soldering nozzle and feed mechanism;
FIG. 6 is a partial sectional view showing a locating pin positioned in a pattern hole;
FIG. 7 is a sectional view of a holding bar;
FIG. 8 is a partial front view showing a cutoff switch; and
FIG. 9 is a schematic view of a wiring arrangement.

Referring now to the drawings, wherein like reference characters designate like or corresponding parts throughout the several views, there is shown in FIG. 1, a frame 11 that is slidably mounted to a base plate 12. A pair of parallel shafts 13 and 14 are stationarily supported on base plate 12 by four stanchions 15. A carriage member 16 is slidably mounted on each of the shafts 13 and 14. Each carriage member 16 is comprised of a pair of housing members 17 and 18 that are connected together by plate 19. As shown in FIG. 2 of the drawings, each housing member is provided with a ball bushing 21 that facilitates the sliding of the carriage members 16 on their respective shafts.

A second pair of parallel shafts 22 and 23 are attached to the housings, such that shafts 22 and 23 lie in planes that are perpendicular to shafts 13 and 14. A carriage member 24 is slidably mounted on each of the shafts 22 and 23 and a top plate 25 is fastened to the carriage members 24 so that the entire assembly slidably moves in unison. A handle 20 is attached to top plate 25, and as top plate 25 can be moved in two mutually perpendicular directions, it can be seen that a point on top plate 25 can be positioned over any particular point on the base plate 12 within the range of travel of carriage members 16 and 24.

Referring now to FIGS. 1, 3, and 4 of the drawings, a vertical plate 26 is attached to top plate 25 in order to support a printed circuitry board 27 that is to be soldered. A follower plate 28 is slidably mounted to vertical plate 26 by means of guides 31 and 32. A bearing 33 is attached to the top end of follower plate 28 by means of shaft 34 and plate 35, which is threadedly attached to plate 28. Bearing 33, which acts as a follower, is biased against cam 36 by spring 37. A rod 38, which is attached to follower plate 28, is provided in order to retain spring 37 in position between follower plate 28 and top plate 25. A holding bracket 41 is attached to follower plate 28 by means of stud 42, and a slide rail 43 is attached to the other end of stud 42. A pair of bars 44 are slidably mounted on slide rail 43, and each bar is provided with a lock screw 45 that locks the bar in position. As shown in FIG. 7 of the drawings, each bar 44 is provided with a notch 46 that positions the board 27 that is to be soldered.

Cam 36 is pinned to shaft 47 that is rotatably mounted in bracket 48, which is attached to vertical plate 26. An electric motor 49 is attached to bracket 48 by means of strap 51, and the motor shaft 52 is coupled to shaft 53 by means of coupling 54. Shaft 53 is rotatably supported in bracket 48 and carries a bevel gear 55 which is attached thereto. Bevel gear 55 meshes with bevel gear 56, which is pinned to shaft 47. Rotation of motor shaft 52 causes cam 36 to be rotated. A normally-closed switch 57 is attached to vertical plate 26, as shown in FIG. 8 of the drawings, and, as shown in FIG. 9 of the drawings, switch 57 is connected in series with motor 51. An arm 58, which is attached to follower plate 28, is provided to actuate switch 57 when follower plate 28 is moved by cam 36.

Referring now particularly to FIGS. 1 and 6 of the drawings, an arm 61, which is attached to base plate 12, is provided with a tubular sleeve 62 that is disposed perpendicular to top plate 25. A bolt 63 is slidably positioned in sleeve 62, and has a reduced diameter portion 64 that engages a hole 65 in a pattern board 66. The pattern board 66 is identical to the printed circuitry board 27 which is to be soldered, except, of course, that no electrical components, such as resistors or capacitors, are positioned on pattern board 66. Pattern board 66 is supported on top plate 25 by stands 67 and 68. A plurality of tapped holes 69 are provided in top plate 25 and an L-shaped bracket 71 is attached at various positions on top plate 25 by a screw that is selectively engaged in the tapped holes 69. Stands 67 and 68 support two edges of pattern 66 and the L-shaped bracket 71 supports one corner of pattern 66.

Solder is supplied to board 27 by a feed mechanism 72, that is more particularly shown in FIG. 5 of the drawings. A reservoir 73 is provided with a quantity of solder 74 that is kept molten by heating coil 75. A thermocouple 76 is positioned in a cavity which is in the wall of reservoir 73, and is connected to a controller 77 which maintains the solder 74 at a constant temperature by regulating the flow of current through heating coil 75. A soldering tip 78 is threadedly attached to an arm 79 that extends from reservoir 73, and a channel 81 is provided in arm 79 that connects resevoir 73 and an orifice 82 in soldering tip 78. A second heating coil 83 is provided around arm 79 adjacent soldering tip 78. A second thermocouple 84 is provided in arm 79 near soldering tip 78 and is connected to a second controller 85 which maintains the solder which is inside orifice 82 at a predetermined temperature by regulating the flow of current through heating coil 83.

In operation, a pattern board 66 is placed in position on stands 67 and 68 and L-shaped bracket 71. Then a board 27, which is to be soldered, is positioned in holding bracket 41 and is maintained there by notches 46 which are provided in bars 44. Board 27 must now be oriented with pattern board 66 so that when the reduced diameter portion 64 of bolt 63 is in a hole 65 of the pattern board 66, a corresponding hole in board 27 is positioned above soldering tip 78. As bars 44 are slidable on slide rail 43, and as board 27 can be moved in notches 46, it can be seen that board 27 can readily be positioned with respect to soldering tip 78 and pattern board 66.

The solder 74 in reservoir 73 is melted by applying current through heating coil 75. A second heating coil 83 is positioned at the soldering tip 78 to maintain the solder in tip 78 at the temperature at which it is to be applied to board 27. By way of example, controller 77 maintains the solder in reservoir 73 at about 400 degrees F. and controller 85 maintains the solder at the tip 78 at about 600 degrees F. By maintaining the solder in the reservoir 73 at the lower temperature, oxidation of the solder is greatly reduced, and what little oxidation does occur is at the top, and thus the solder flowing through channel 81 is uncontaminated.

When the molten solder is at the desired temperature, the operator moves top plate 25 by its handle 20 until the reduced diameter portion 64 of bolt 63 can be positioned in one of the holes in the pattern board 66. The operator then pushes button switch 86 which energizes motor 49, which in turn rotates cam 36. Cam 36 depresses follower plate 28 which carries arm 58, and when arm 58 moves away from switch 57, switch 57 closes and keeps motor 49 energized while cam 36 makes a complete revolution. When follower plate 28 is depressed, printed circuitry board 27 is lowered so that the joint to be soldered contacts soldering tip 78 that deposits a globule of solder at the joint. Cam 36 maintains board 27 in contact with soldering tip 78 a sufficient length of time so that the solder has time to flow into the joint being soldered. After cam 36 makes one revolution, follower plate 28 is raised by spring 37 and arm 58 opens switch 57 which shuts off motor 49.

Bolt 63 is then raised and the top plate 25 is moved to a new position that is to be soldered. Bolt 63 is provided with a pin 87 that travels in slot 88 of sleeve 62. When bolt 63 is raised a sufficient height so that pin 87 has cleared slot 88, bolt 63 can be rotated, and bolt 63 will be retained in a raised position.

After board 27 has all its joints soldered, it can be removed by loosening one of the lock screws 45 and then sliding one of the bars 44 away from the board 27. A new board can then be mounted in the holding bracket 41.

It can thus be seen that the present invention provides an improved soldering machine for soldering electrical components to printed circuitry board. Also, an improved mechanism is provided for delivering solder to a joint on a printed circuitry board that is to be soldered.

Obviously many modifications and variations of the present invention are possible in the light of the above teachings. It is therefore to be understood, that within the scope of the appended claims, the invention may be practiced otherwise than as specifically described.

What is claimed is:

1. A soldering machine for soldering joints on a printed circuitry board comprising: a base plate, a top plate slidably attached to said base plate and movable in two mutually perpendicular directions and in a plane parallel to said base plate, means on said top plate for holding said printed circuitry board to be soldered, means on said top plate for holding a pattern board in a predetermined position relative to the position of said printed circuitry board, said pattern board being a facsimile of said printed circuitry board, soldering means attached to said base plate and extending above said top plate, indexing means attached to said base plate and having a portion engageable with said pattern board whereby positioning a point on said pattern board relative to said indexing means causes a corresponding point on said printed circuitry board to be positioned relative to said soldering means, and means for lowering said printed circuitry board into contact with said soldering means.

2. A soldering machine as set forth in claim 1 wherein said soldering means comprises: a reservoir having a cavity for holding a quantity of solder; an outwardly extending arm attached to said reservoir and having a channel communicating with said cavity; and an upwardly extending soldering tip attached to said arm and having an orifice communicating with said channel whereby a globule of solder is delivered to the end of said soldering tip.

3. A soldering machine as set forth in claim 1 wherein said soldering means comprises: a reservoir having a cavity for holding a quantity of solder; an outwardly extending arm attached to said reservoir and having a channel communicating with said cavity; an upwardly extending soldering tip attached to said arm and having an orifice communicating with said channel whereby a globule of solder is delivered to the end of said soldering tip; first and second heating coils disposed about said arm, said first heating coil being contiguous to said reservoir and said second heating coil being contiguous to said soldering tip; and first and second means connected, respectively, to said first and second heating coils for maintaining said solder in said reservoir and said soldering tip in a molten condition at different temperatures.

4. A solder feed mechanism as set forth in claim 3 wherein said first means comprises a first controller coupled to said first heating coil and a first thermocouple in said reservoir connected to said first controller, and said second means comprises a second controller coupled to said second heating coil and a second thermocouple in said arm connected to said second controller.

5. A soldering machine for soldering joints on a printed circuitry board comprising: a base plate, a top plate slidably attached to said base plate and movable in two mutually perpendicular directions and in a plane parallel to said base plate, a slidably mounted holder attached to said top plate for holding said printed circuitry board to be soldered, means on said top plate for holding a pattern board in a predetermined position relative to the position of said printed circuitry board, said pattern board being a facsimile of said printed circuitry board, soldering means attached to said base plate and extending above said top plate, indexing means attached to said base plate and having a portion engagable with said pattern board whereby positioning a point on said pattern board relative to said indexing means causes a corresponding point on said printed circuitry board to be positioned relative to said soldering means, and a cam engaging said slidably mounted holder for lowering said printed circuitry board into contact with said soldering means.

6. A soldering machine as set forth in claim 5 wherein said soldering machine comprises: a reservoir having a cavity for holding a quantity of solder; an outwardly extending arm attached to said reservoir and having a channel communicating with said cavity; and a soldering tip attached to said arm and having an orifice communicating with said channel whereby a globule of solder is delivered to the end of said soldering tip.

7. A soldering machine as set forth in claim 5 wherein said soldering means comprises: a reservoir having a cavity for holding a quantity of solder; an outwardly extending arm attached to said reservoir and having a channel communicating with said cavity; an upwardly extending soldering tip attached to said arm and having an orifice communicating with said channel whereby a globule of solder is delivered to the end of said soldering tip; first and second heating coils disposed about said arm, said first heating coil being contiguous to said reservoir and said second heating coil being contiguous to said soldering tip; and first and second means connected, respectively, to said first and second heating coils for maintaining said solder in said reservoir and said soldering tip in a molten condition at different temperatures.

8. A solder feed mechanism as set forth in claim 7 wherein said first means comprises a first controller coupled to said first heating coil and a first thermocouple in said reservoir connected to said first controller, and said second means comprises a second controller coupled to said second heating coil and a second thermocouple in said arm connected to said second controller.

References Cited in the file of this patent

UNITED STATES PATENTS

| | | |
|---|---|---|
| 767,465 | Wirth et al. | Aug. 16, 1904 |
| 2,293,455 | Disch et al. | Aug. 18, 1942 |
| 2,344,589 | Bogner | Mar. 21, 1944 |
| 2,726,615 | Downing | Dec. 13, 1955 |
| 2,771,049 | Fish | Nov. 20, 1956 |
| 2,908,249 | Rokosz et al. | Oct. 13, 1959 |

FOREIGN PATENTS

| | | |
|---|---|---|
| 825,297 | Great Britain | Dec. 16, 1959 |